US011465521B2

(12) United States Patent
Austrheim et al.

(10) Patent No.: US 11,465,521 B2
(45) Date of Patent: Oct. 11, 2022

(54) MULTI CHARGING STATION FOR A STORAGE SYSTEM

(71) Applicant: Autostore Technology AS, Nedre Vats (NO)

(72) Inventors: Trond Austrheim, Etne (NO); Øystein Gjerdevik, Skjold (NO); Jørgen Djuve Heggebø, Ølen (NO)

(73) Assignee: Autostore Technology AS, Nedre Vats (NO)

( * ) Notice: Subject to any disclaimer, the term of this patent is extended or adjusted under 35 U.S.C. 154(b) by 213 days.

(21) Appl. No.: 16/761,912

(22) PCT Filed: Nov. 7, 2018

(86) PCT No.: PCT/EP2018/080488
§ 371 (c)(1),
(2) Date: May 6, 2020

(87) PCT Pub. No.: WO2019/092029
PCT Pub. Date: May 16, 2019

(65) Prior Publication Data
US 2021/0170895 A1  Jun. 10, 2021

(30) Foreign Application Priority Data
Nov. 7, 2017 (NO) .................................... 20171763

(51) Int. Cl.
*B60L 53/36* (2019.01)
*B65G 1/04* (2006.01)
(52) U.S. Cl.
CPC ............ *B60L 53/36* (2019.02); *B65G 1/0464* (2013.01); *B65G 1/0492* (2013.01)
(58) Field of Classification Search
CPC ...... B65G 1/0464; B65G 1/0492; B60L 53/36
See application file for complete search history.

(56) References Cited
U.S. PATENT DOCUMENTS

| 5,187,423 A | 2/1993 | Marton |
| 9,139,310 B1 | 9/2015 | Wang |
| (Continued) | | |

FOREIGN PATENT DOCUMENTS

| EP | 2679436 A1 | 1/2014 |
| JP | S62-205819 A | 9/1987 |
| (Continued) | | |

OTHER PUBLICATIONS

International Search Report issued in Application No. PCT/EP2018/080488, dated Feb. 22, 2019 (4 pages).
(Continued)

*Primary Examiner* — Saul Rodriguez
*Assistant Examiner* — Ashley K Romano
(74) *Attorney, Agent, or Firm* — Osha Bergman Watanabe & Burton LLP

(57) ABSTRACT

A storage system includes a bin storing grid for storing storage bins in columns of the grid, a base with rails provided on top of the grid, and a vehicle configured to move vertically along the rails in a vehicle operating space. The system includes a charging station assembly for charging the rechargeable power sources of the vehicle. The charging station assembly includes a plurality of charging stations located above each other. Each charging station includes a power source carrier for carrying one of the respective power sources. A charging station support is supporting the charging stations in relation to the base. A transportation device is connected to the base for vertical displacement of the charging stations in relation to the base. A holding device is configured to selectively hold one of the charging stations at an exchange location in which the power source carrier of the one charging station is a predetermined height above the base. The transportation device is configured to vertically displace other charging stations to an upper location above (Continued)

the vehicle operating space or to a lower location below the vehicle operating space.

18 Claims, 9 Drawing Sheets

(56) References Cited

U.S. PATENT DOCUMENTS

| | | | |
|---|---|---|---|
| 2012/0068664 A1 | 3/2012 | Franzen et al. | |
| 2016/0236867 A1* | 8/2016 | Brazeau | B25J 5/007 |
| 2016/0325932 A1 | 11/2016 | Hognaland | |
| 2017/0008410 A1* | 1/2017 | Krammer | B60L 53/36 |
| 2020/0130510 A1* | 4/2020 | Eck | G08G 5/0026 |

FOREIGN PATENT DOCUMENTS

| | | |
|---|---|---|
| JP | H06-48277 A | 2/1994 |
| NO | 317366 B1 | 10/2004 |
| WO | 2014/209208 A1 | 12/2014 |
| WO | 2015/104263 A2 | 7/2015 |
| WO | 2015/193278 A1 | 12/2015 |
| WO | 2016/120075 A1 | 8/2016 |

OTHER PUBLICATIONS

Written Opinion issued in International Application No. PCT/EP2018/080488, dated Feb. 22, 2019 (7 pages).

International Preliminary Report on Patentability issued in Application No. PCT/EP2018/080488, dated Jan. 20, 2020 (16 pages).

Search Report issued in Norwegian Application No. 20171763, dated Jun. 7, 2018 (2 pages).

* cited by examiner

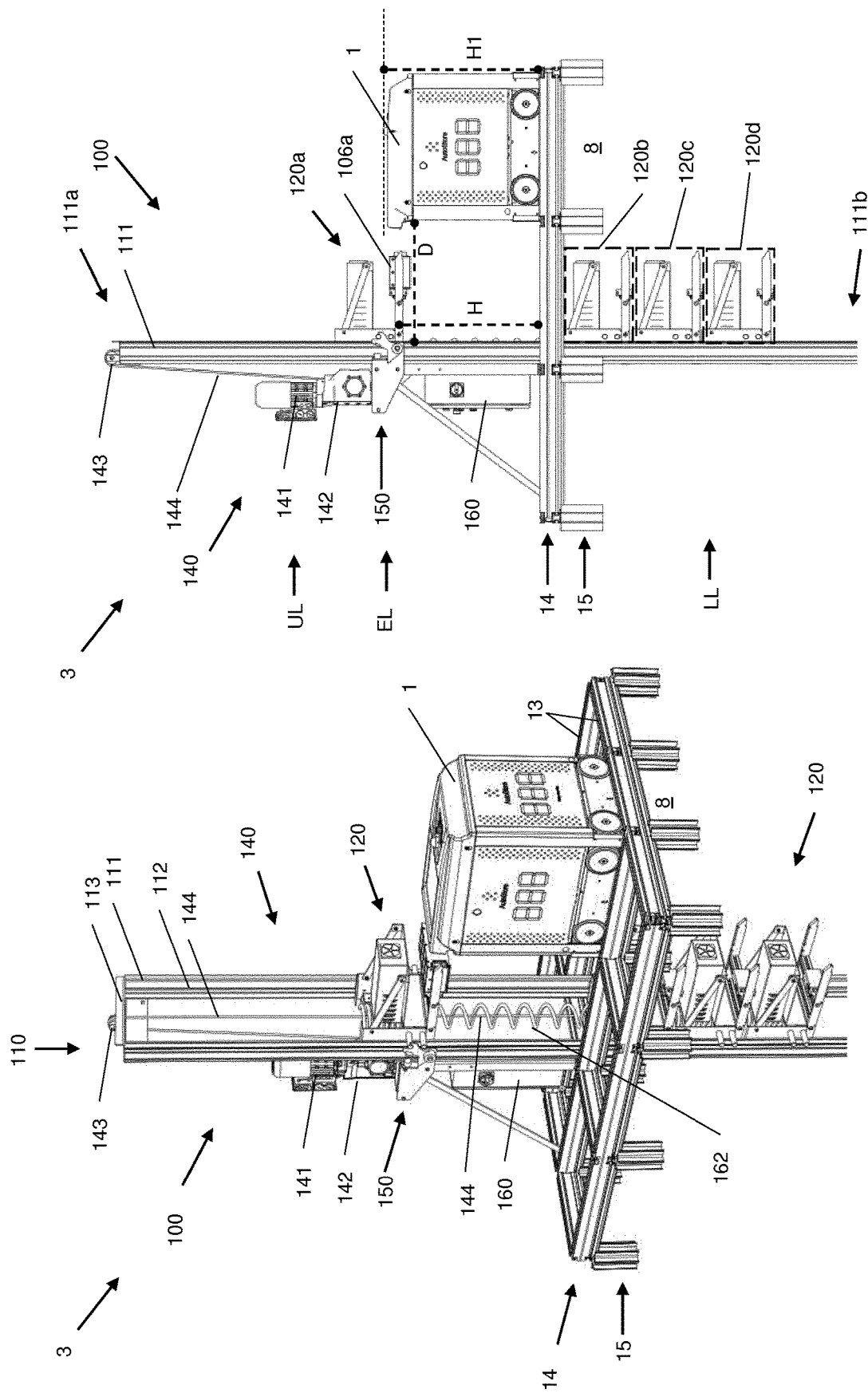

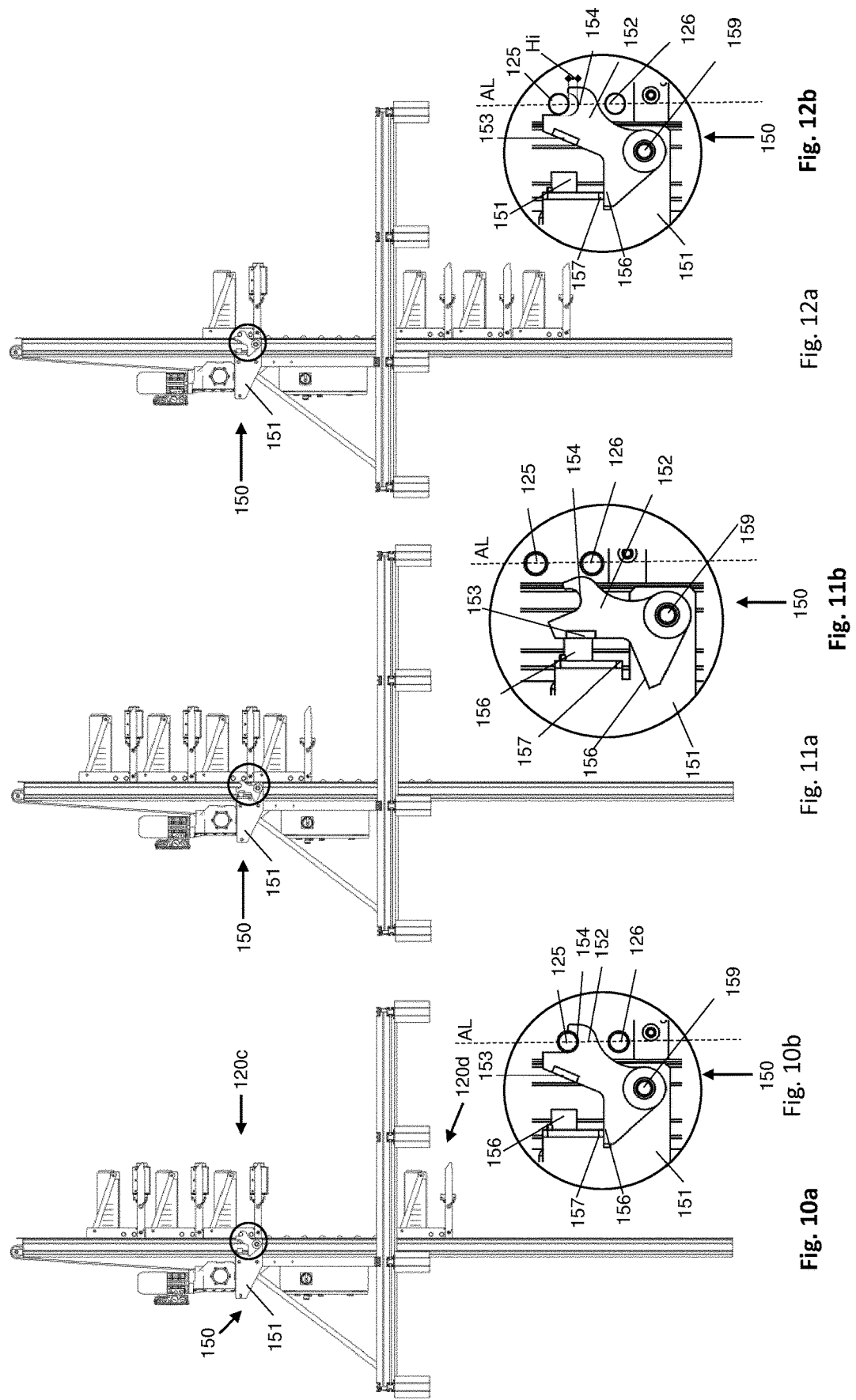

MULTI CHARGING STATION FOR A STORAGE SYSTEM

TECHNICAL FIELD

The present invention relates to a storage system comprising a charging station assembly and a method for exchanging a power source of a vehicle operating in a storage system.

BACKGROUND AND PRIOR ART

WO2016/120075A1, the contents of which are incorporated herein by reference, shows an example of an automated storage and retrieval system of the type identified above. The disclosed container handling vehicles are dimensioned so that they have a footprint, i.e. a contact area against the track system, which has a horizontal extent that is equal to the horizontal extent of a grid cell. This allows the container handling vehicles to be operated simultaneously above neighbouring grid cells, liberating more space for the container handling vehicles to travel on the track system as compared to prior art systems.

Within the art, such a container handling vehicle, i.e. a container handling vehicle having a footprint with a horizontal extent corresponding to the horizontal extent of a single grid cell, is sometimes referred to as a "single cell" container handling vehicle.

Another single cell container handling vehicle is disclosed in WO2015/193278A1, the contents of which are incorporated herein by reference.

The single cell design disclosed in WO2016/120075A1 and WO2015/193278A1 reduces the space required for the container handling vehicles to travel on the track system, thus allowing more vehicles to operate on the track system without interfering with each other.

There are situations where it may be beneficial that the container handling vehicles has a horizontal extent that is larger than a single grid cell. For example, if the container handling vehicles are operated under a battery replacement regime, in which a container handling vehicle is instructed to move to a battery replacement station to have its onboard battery replaced when it nears depletion, it may be advantageous, in order to facilitate battery replacement, to position the battery compartment or slot in a section of the vehicle body which protrudes beyond the footprint of the vehicle.

If the footprint of the container handling vehicle has a horizontal extent corresponding to the horizontal extent of a grid space, the protruding battery slot will, when the vehicle is positioned above a grid cell, protrude into a neighbouring grid cell. This will prevent other container handling vehicles from operating on the neighbouring grid cell, thus limiting the space available for other container handling vehicles to operate on the track system.

A charging station for charging remotely operated vehicles is known. A detailed description of a relevant prior art storage system is presented in WO 2015/104263 A1, and details of a prior art vehicle relevant for use of such charging stations is disclosed in Norwegian patent NO317366. The prior art vehicle is configured to pick up and store storage bins within a three-dimensional storage grid. The bins are stacked on top of each other up to a certain height. The storage grid is normally constructed as columns interconnected by top rails onto which remotely operated vehicles, or robots, are arranged to move laterally. Each robot is equipped with a rechargeable battery providing electrical effect to an integrated motor. The robot typically communicates with a control system via a wireless link and is recharged at a charging station when needed, typically at night.

An example of a prior art storage system is illustrated in FIG. 1. The storage system 3 includes a plurality of robots 1 configured to move on dedicated supporting rails 13 and to receive a storage bin 2 from a storage column 8 within a bin storing grid 15. The prior art storage system 3 may also include a dedicated bin lift device 50, the latter being arranged to receive a storage bin 2 from the robot 1 at the top level of the storage system 3 and to convey the storage bin 2 down in a vertical direction to a delivery station, or port 60.

An example of prior art charging system is illustrated in FIG. 2 comprising a robot 1 with a battery 6 operated on a base 14 of rails 13 above a bin storing grid 15 and a plurality of charging stations 20,20' for charging the battery 6. The charging stations 20,20' are fixed to the base 14 in positions that are accessible for the part of robot 1 which includes the battery 6. FIG. 2 shows a particular situation where the robot 1 is approaching the charging station 20 in order to transfer an almost discharged battery 6 to a battery vacant charging station 20. After a successful transfer, the robot 1 is moved to another charging station 20' by aid of an auxiliary power source. The other charging station 20' is typically the closest charging station 20' that contains a battery 6' being charged to a fully operational level.

It is thus an object of the present invention to provide a solution where the time between arrival of the robot 1 at the station to the departure of the robot 1 with a new battery 6' from the station 20 is reduced.

A more general object is to provide a more efficient way of changing batteries of a robot 1 more efficient while at the same time effectively charge a multiple number of batteries within a smallest possible area.

Another object of the invention is to provide a simple solution with few components.

SUMMARY OF THE INVENTION

The present invention relates to a storage system comprising:
  a bin storing grid for storing storage bins in columns of the grid;
  a base with rails provided on top of the grid;
  a vehicle configured to move horizontally along the rails in a vehicle operating space, each vehicle being powered by a rechargeable power source;
  a charging station assembly for charging the rechargeable power sources; where the charging station assembly comprises:
  a plurality of charging stations located above each other, each charging station comprising a power source carrier for carrying one of the respective power sources;
  a charging station support for supporting the charging stations in relation to the base;
  a transportation device connected to the base for vertical displacement of the charging stations in relation to the base;
where the charging station assembly is configured to selectively hold one of the charging stations at an exchange location in which the power source carrier of the one charging station is at a predetermined height above the base; wherein the transportation device is configured to vertically displace other charging stations to an upper location above the vehicle operating space or to a lower location below the vehicle operating space.

The rechargeable power sources are preferably rechargeable batteries.

The vertical displacement of other charging stations to the upper location above the vehicle operating space or to the lower location below the vehicle operating space is done to allow the vehicle to move towards the battery carrier, i.e. to allow an exchange (i.e. either transferring a battery from the vehicle to the carrier or to transport a battery from the carrier to the vehicle) while preventing an undesired collision between the vehicle and one of the other charging stations. In addition, the batteries are moved away from the vehicle operating space during their charging.

The vehicle is configured to move towards the power source carrier which is held at the exchange location to deliver its power source which is in need of charging. The power source is then delivered from the vehicle to the power source carrier. The vehicle is then configured to move away from the charging station while the charging station assembly is vertically displacing another power source which has been charged to an operational level to the exchange location. The vehicle is configured to move towards the power source carrier again, and the power source being charged to an operational level is now delivered from the power source carrier to the vehicle.

In one aspect, the vehicle comprises an additional rechargeable battery that takes care of the movement of the vehicle during the exchange of a rechargeable power source. Alternatively, an actuator, such as an electric or hydraulic actuator, may take care of movement of the vehicle towards and away from the charging station assembly in the time period in which the power source is removed from the vehicle.

The additional rechargeable battery may also allow continued communication with other vehicles, communication with a superior control system for the storage system etc. during the time period in which the power source is removed from the vehicle. The additional rechargeable battery may be charged by the power source.

In one aspect, the delivery of the power source from the vehicle to the carrier and from the carrier to the vehicle is performed by the vehicle itself. In one aspect, the battery carrier of the vehicle can be lowered so that the power source is lowered onto the carrier of the charging station. In the same way, the battery carrier of the vehicle can be elevated so that the power source can be lifted up from the carrier of the charging station.

The vehicle operating space is defined as the available space the vehicle can operate in. Typically, the vehicle operating space is defined by the length and width of bin storing grid and height of the vehicle itself. The bottom plane of the vehicle operating space is defined by the base with rails. Of course, there may be areas on top of the base in which the vehicle cannot operate or in which the vehicle is not allowed to operate—such areas are not considered to be a part of the vehicle operating space. According to the definition above, the lower location is located below the base and the upper location is located at a height above the vehicle.

In one aspect, the exchange location is located in the vehicle operating space.

In one aspect, the charging station support comprises at least one guiding column and where each charging station comprises guiding elements configured to be guided by the at least one guiding column. Preferably, there are two parallel guiding columns each comprising a guiding track. The guiding column or columns are preferably vertical or close to vertical. The guiding columns may be fixed to the base, to vertical posts of the bin storage grid and/or to horizontal posts of the bins storage grid. Alternatively, the guiding column or columns are fixed to the roof of the building in which the storage system is provided. Alternatively, the vertically guiding columns could be continuations of the vertical grid posts of the grid structure.

The guiding elements are preferably rollers or wheels provided in guiding profiles of the at least one guiding column.

In one aspect, the charging station assembly comprises a holding device configured to selectively hold one of the charging stations at the exchange location.

In one aspect, each charging station comprises a frame structure and a holding pin protruding from the frame structure, where the holding device is configured to selectively engage with the holding pin. The holding pin is preferably protruding in a horizontal direction. During vertical movement of the charging station in relation to the guiding column, the holding pin is moving linearly along a line preferably parallel with the guiding column.

The holding device is preferably fixed to the at least one guiding column. Alternatively, the holding device can be fixed to other stationary parts of the storage system, such as the base or the bin storing grid.

In one aspect, the holding device comprises:
a holding base;
a holding element pivotably connected to the holding base;
a recess provided in the holding element for releasable engagement with the holding pin.

In one aspect, the holding device is configured to be in one of the following states:
a first state in which the holding pin of one of the charging stations is engaged with the recess;
a second state in which the holding element is in a position in which the recess is out of alignment with the holding pin of one of the charging stations.

In one aspect, the holding element comprises a magnet and wherein the holding base comprises an electromagnet; wherein the first state, the magnet is disengaged from the electromagnet and wherein a second state the magnet is engaged with the electromagnet, causing the holding element to be in a position in which the recess is out of alignment with the holding pin of one of the charging stations.

The holding element further comprises a first stopping element and the holding base comprises a second stopping element, where the holding device is configured to be in the following state:
an intermediate state, in which the magnet is disengaged from the electromagnet and where the first and second stopping elements are engaged with each other, causing the recess to be in alignment with the holding pin of one of the charging stations.

In one aspect, at least one of the charging stations comprises a return pin protruding from the frame structure, where the return pin is configured to push the magnet of the holding element into magnetic engagement with the electromagnet during vertical movement of the charging station. Alternatively, the electromagnet is sufficiently powerful to pull the magnet and hence the holding element from the first state to the second state. In the preferred embodiment, all charging stations comprises such a return pin. In yet an alternative embodiment, only the lowermost charging station has such a return pin.

Alternatively, one holding pin is provided at the desired location on the guiding column or guiding columns and the holding device is provided on the charging station.

The transportation device can be connected directly to the base, either above the base or below the base. Alternatively, the transportation device is connected to the base via the grid. Alternatively, the transportation device can be connected to the base via the charging station support. Preferably, the transportation device is connected to the vertical guiding columns of the charging station support.

In one aspect, transportation device comprises:
a remotely operated motor;
a wire drum configured to be rotated by the motor;
a sheave located at a position above the upper position of the upper charging station;
a wire connected between the wire drum and the lowermost charging station via the sheave.

In the preferred embodiment, the sheave is connected to an upper section of the at least one guiding column. Alternatively, the sheave is connected to the roof of the building in which the storage system is located.

Each charging station comprises a charging unit, where the charging units are electrically connected to each other by means of flexible electrical conductors, and where at least one of the charging units is electrically connected to a power supply system. Alternatively, all charging units are connected to the power supply system via separate electrical conductors. In yet an alternative, there are one common charging unit for supplying power to all power sources. Power can by supplied by a physical connection, or by induction.

It should be mentioned that the power for charging the batteries can be supplied by solar energy provided via solar panels connected to the charger or via a windmill connected to the charger. Power can also be provided by a combination of two or more of solar energy, windmill energy and electric current transferred via a power grid.

The present invention also relates to a method for exchanging a power source of a vehicle operating in a storage system comprising a bin storing grid, a base with rails provided on top of the grid, where the vehicle is configured to move vertically along the rails in a vehicle operating space, where the storage system further comprises a charging station assembly comprising a plurality of charging stations;
where the method comprises the steps of:
driving a remotely operated vehicle with a power source to be charged to the charging station assembly;
vertically displacing a first, unoccupied, power source carrier of a first charging station to a predetermined height above the base;
vertically displacing other charging stations to an upper location above the vehicle operating space or to a lower location below the vehicle operating space;
driving the remotely operated vehicle towards the first, unoccupied, power source carrier;
disconnecting the power source to be charged from the vehicle and connecting it to the first power source carrier;
driving the remotely operated vehicle a predetermined distance away from the first power source carrier;
vertically displacing a second power source carrier of a second charging station to the predetermined height above the base, the second power source carrier carrying a second power source charged to an operational level;
vertically displacing other charging stations to the upper location or the lower location;
driving the remotely operated vehicle towards the second power source carrier;
disconnecting the power source from the second power source carrier and connecting it to the vehicle.

In one aspect, the step of vertically displacing one of the power source carriers to the predetermined height comprises the steps of:
moving a holding element of a holding device out of alignment with holding pins of the charging stations;
moving the one charging station to an initial height above desired height;
moving a recess of the holding element into alignment the holding pin of the one charging station;
vertically move the charging station until the holding pin is engaged with the recess.

Preferably, the power source is located in the upper part of the vehicle. In such an embodiment, the charging unit is located above the protruding battery carrier, and the vehicle is moving towards the carrier below the charging unit. Hence, the vehicle is moving under the charging unit of the charging station.

Alternatively, the power source could be located in the lower part of the vehicle. In such an embodiment, the charging unit could be located below the protruding battery carrier, and the vehicle could move towards the carrier above the charging unit of the charging station. It would also be possible to locate the power source on the side of the vehicle, for example fixed to the inside of or the outside of the side wall of the vehicle. In such an embodiment, the charging unit could be located either above or below the carrier.

It should be noted that when the lowermost charging station is held by the holding device, there is no need for the transportation device to lower any charging stations to the lower location, as no charging station will prevent the movement of the vehicle to and from the carrier. In such a situation, all the other charging stations are displaced to the upper location. In the same way, if the uppermost charging station is held by the holding device, all other charging stations are displaced to the lower location.

According to the invention described above, the storage system with the charging assembly provides for an efficient way of changing batteries of the vehicle.

Moreover, only a relatively small area on top of the bin grid structure is occupied. In the preferred embodiment, only two vertical storage columns are occupied by the charging assembly. However, it would also be possible to use the principle of the present invention to obtain a charging assembly occupying only one vertical storage column. In such an embodiment, the vertical guiding columns could be fixed to the horizontal posts of the bin storing grid instead of the vertical posts.

It is also achieved a relatively simple solution which has few components, and which are easy to operate.

DETAILED DESCRIPTION

Embodiments of the invention will now be described in detail by way of example only and with reference to the enclosed drawings, where:

FIG. 3 shows a perspective view of an exemplary charging station assembly according to the present invention mounted to a base of rails on top of a bin storing grid 15, where a remotely operated vehicle or robot is arranged to move laterally along the rails;

FIG. 4 shows a side view of the assembly of FIG. 3;

FIGS. 10a, 11a and 12a illustrate side views of the assembly with the charging stations moved between different locations;

FIGS. 10b, 11b, 12b illustrate an enlarged view of the holding device encircled in FIGS. 10a, 11a and 12a respectively;

Figure 1:
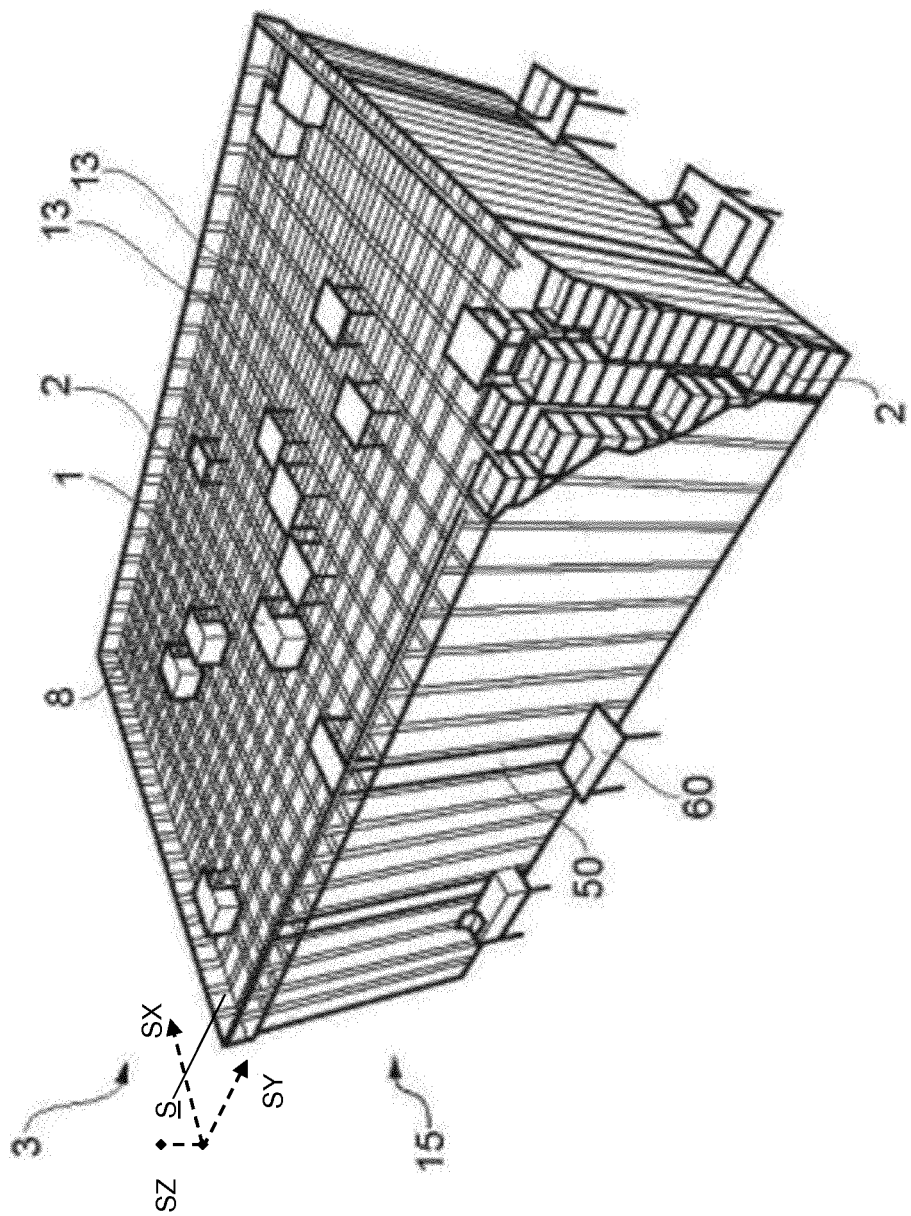
FIG. 1 shows a prior art automated storage and retrieval system.

It is now referred to FIGS. 3 and 4. Here, an upper part of a storage system 3 comprising a storage grid 15 is shown. The storage system 3 and storage grid 15 corresponds to the storage system 3 and storage grid 15 of FIGS. 1 and 2 described in the introduction above. As described above, the storage grid 15 comprises vertical posts and horizontal posts defining columns 8 in which storage bins 2 can be stored above each other. On top of the grid 15, a base 14 with tracks or rails 13 are provided.

Figure 2:
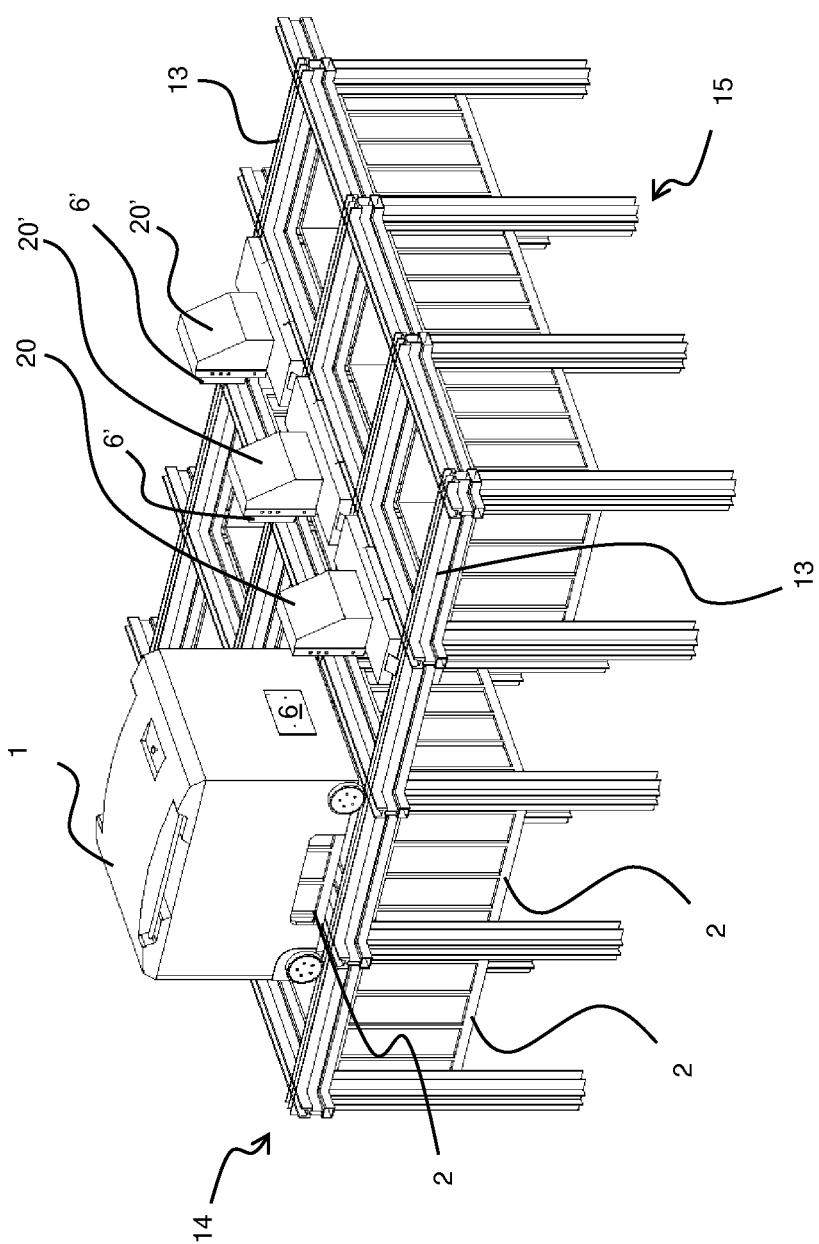
FIG. 2 shows a prior art charging system.
Figure 6:
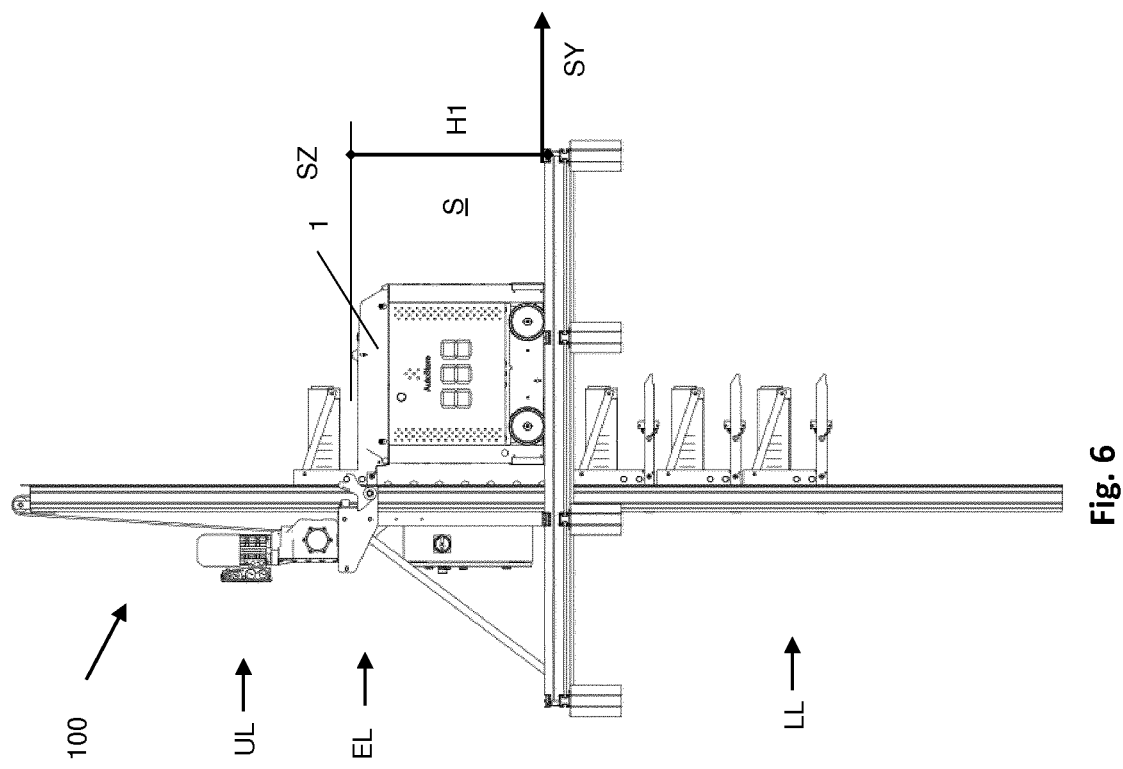
FIG. 6 shows a side view of the assembly of FIG. 5.
Figure 7:
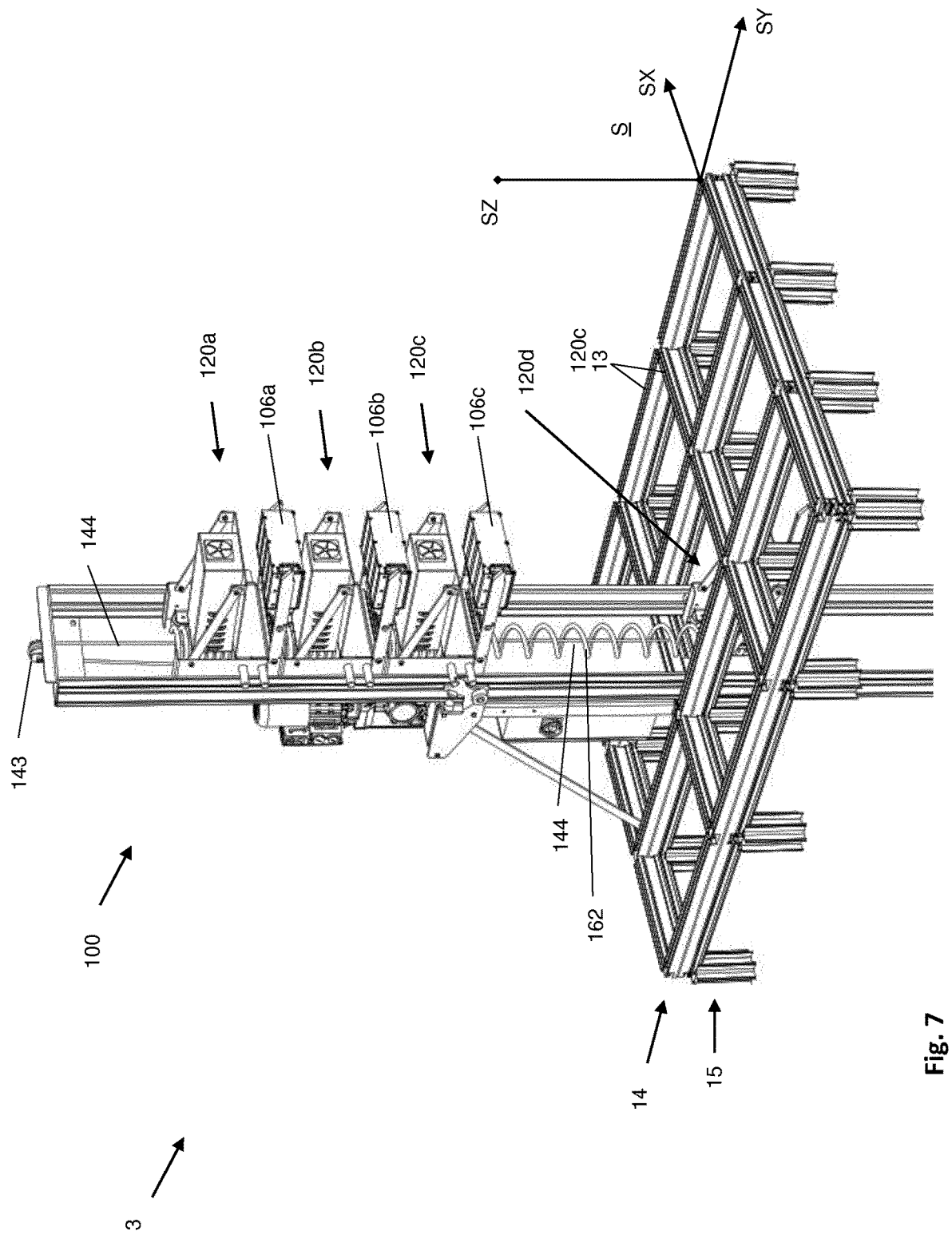
FIG. 7 shows a perspective view of the charging station assembly of FIG. 3 with three charging stations located above the base and one charging station located below the base.

A vehicle 1 is configured to move horizontally along the rails 13 in a vehicle operating space S shown in FIGS. 1, 6 and 7. The space S is defined in the introduction above and is indicated in the drawings by the perpendicular horizontal axis SX and SY and a vertical axis SZ, where the plane defined by the axis SX and SY corresponds to the plane in which the rails 13 are located. The height H1 of the vehicle 1 is shown in FIG. 4 and FIG. 6, corresponding to the height of the space S.

The vehicle 1 itself is known from the publications mentioned in the introduction above. The vehicle 1 is powered by a rechargeable power source 106, typically in the form of a rechargeable battery. The vehicle 1 also comprises an additional battery as described in the introduction above, allowing the vehicle 1 to move a relatively smaller distance during an exchange of the rechargeable battery 106.

Figure 9:
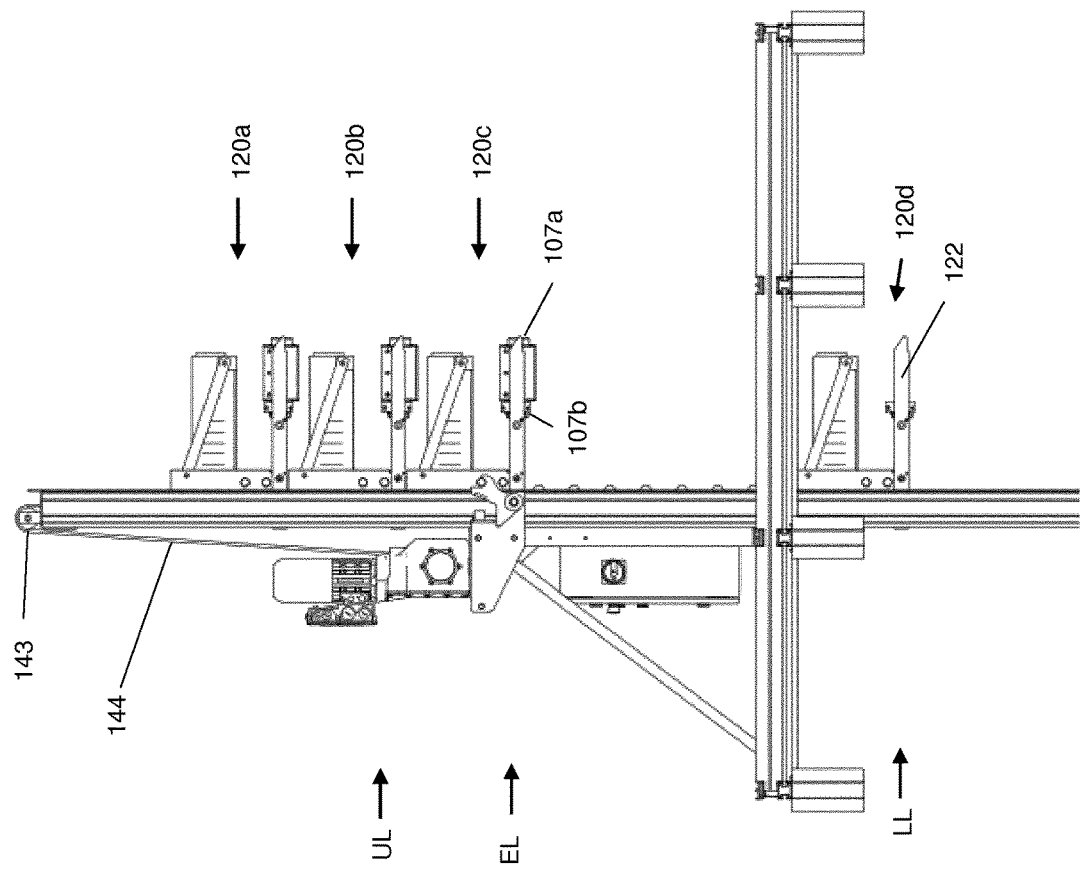
FIG. 9 illustrates a side view of the assembly of FIGS. 7 and 8.
Figure 8:
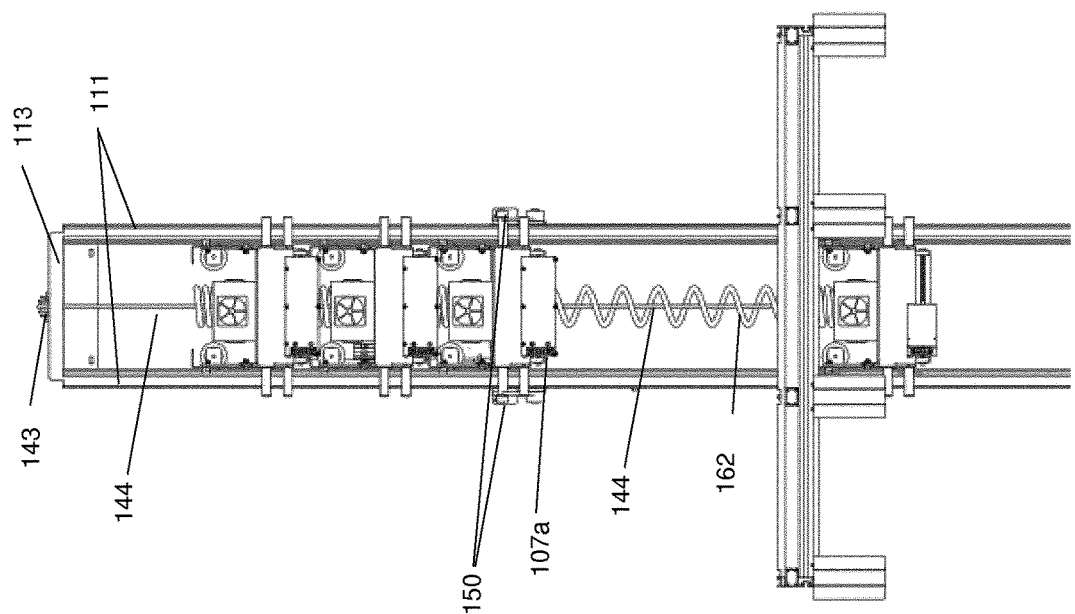
FIG. 8 illustrates a front view of the assembly of FIG. 3 in the configuration of FIG. 7.

The battery 106 comprises a first connector 107a for connection to the vehicle and a second connector 107b for connection to a charging station as shown in FIGS. 8 and 9. The first and second connectors 107a, 107b are provided on opposite sides of the battery 106.

The storage system 3 comprises a charging station assembly 100 for charging a number of rechargeable power sources 106 and for exchanging a low-energy power source 106 of a vehicle with a battery recharged to a fully operating level.

The charging station assembly 100 comprises a charging station support 110 and a number of charging stations 120. In the present embodiment, there are four charging stations, a first and uppermost charging station 120a, a second charging station 120b below the uppermost charging station, a third charging station 120c below the second charging station and a fourth and lowermost charging station 120d as shown in FIGS. 4, 7 and 9. There should be at least two such charging stations 120, one charging station being available to receive a battery in need of charging from a vehicle and one charging station available to deliver a fully or partially charged battery to that vehicle.

The charging station support 110 comprises two vertically guiding columns 111 (see FIG. 8) fixed to the base 14 and/or to the vertical and/or horizontal posts of the grid 15. As shown in FIG. 4, an upper end 111a of the guiding column 111 is located above the base 14 and lower end 111b of the guiding columns 111 is located below the base 14. The guiding columns 111 comprises guiding profiles 112 in their longitudinal direction. A cross member 113 is fixed between the upper ends 111a of the guiding columns 111. Alternatively, the vertically guiding columns 111 could be continuations of the vertical grid posts.

Figure 15:
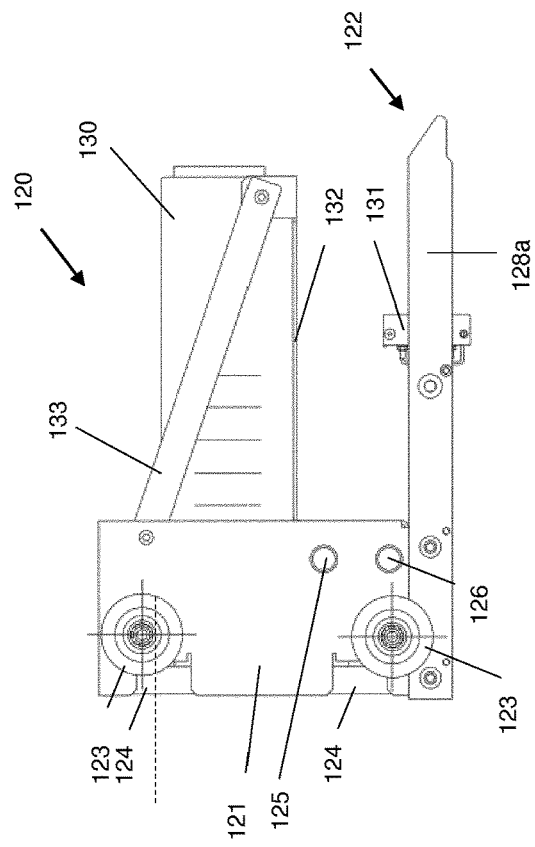
FIGS. 13, 14 and 15 illustrate the exemplary charging station in a perspective view, a front view and a side view respectively.
Figure 13:
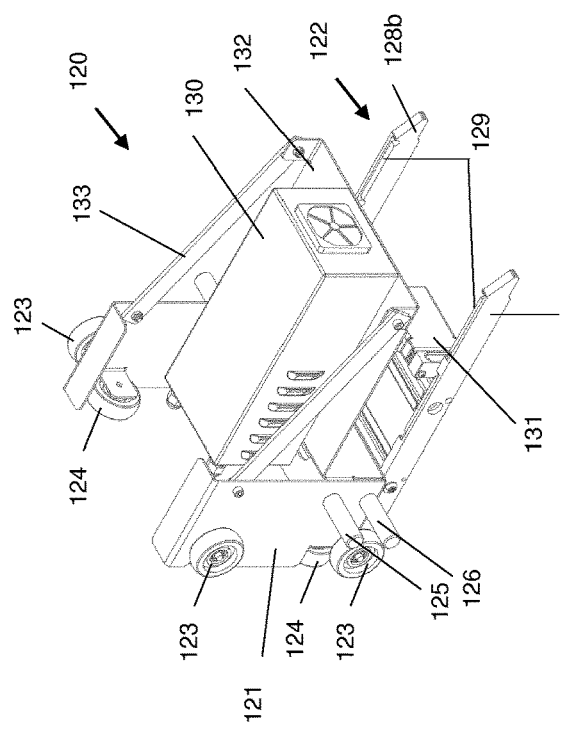
Figure 14:
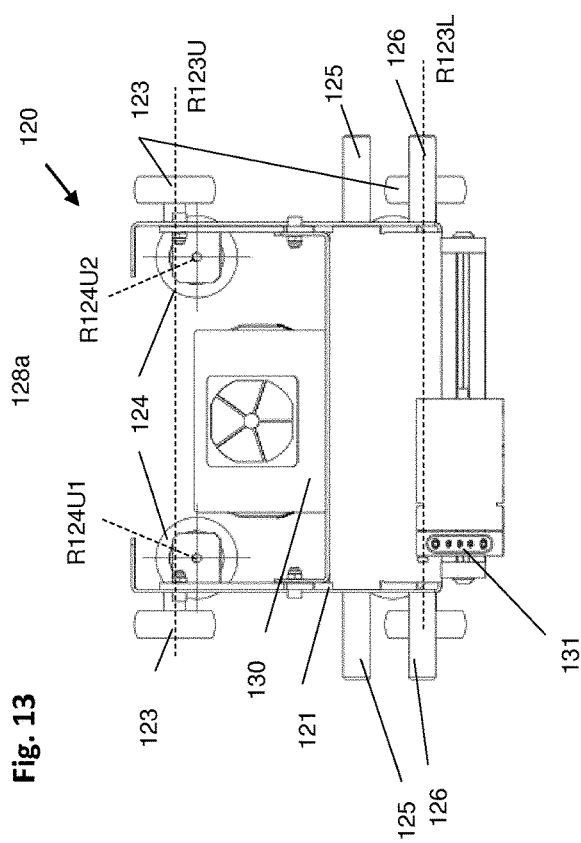

The charging station 120 will now be described with reference to FIGS. 13, 14 and 15. The charging station 120 comprises a frame structure 121 and guiding elements 123, 124 in the form of wheels which are rotably connected to the frame structure 121. There are four wheels 123, of which one pair of upper wheels 123 have a common rotation axis R123U and one pair of lower wheels 123 have a common rotation axis R123L parallel to the upper rotation axis R123U. In addition, there are two upper and two lower wheels 124, each having separate rotation axis parallel to each other and perpendicular to the axis R123U, R123L of the wheels 123. In FIG. 14, the rotation axis R124U1 and R124U2 of the two upper wheels 124 are indicated. The wheels are engaged with the tracks 112 of the guiding columns 111, ensuring that the frame structure 121 can be moved linearly up and down along the guiding columns 111.

The charging station 120 further comprises a battery carrier 122 comprising first and second elongated carrier elements 128a, 128b fixed to the frame structure 121 parallel to, and at a distance from, each other. The battery carrier elements 128a, 128b are adapted to be engaged with the battery 106, as will be apparent from the description further below. As shown in FIG. 13, the carrier elements 128 comprises tracks 129 for engagement with the battery 106.

The charging station 120 further comprises a charging unit 130 mounted to a plate 132 connected to the frame structure 121. Supporting arms 133 are connected between the outer end of the plate 132 and the frame structure 121 to carry the weight of the charging unit 130. The charging unit 130 is electrically connected to a battery connector 131, for charging a battery 106 when such a battery is connected to the battery connector 131.

The charging unit 120 further comprises a holding pin 125 protruding horizontally from the frame structure 121 in a direction parallel to the cross member 113 of the charging station support 110. There is one such holding pin 125 on each side of the frame structure 121, as shown in FIG. 14. Below each holding pin 125, a return pin 126 is protruding from the frame structure 121.

The charging stations 120a, 120b, 120c, 120d are connected above each other to the charging station support 110. The charging stations 120a-d are independently movable up and down along the tracks 112 of the guiding columns 111.

Figure 5:
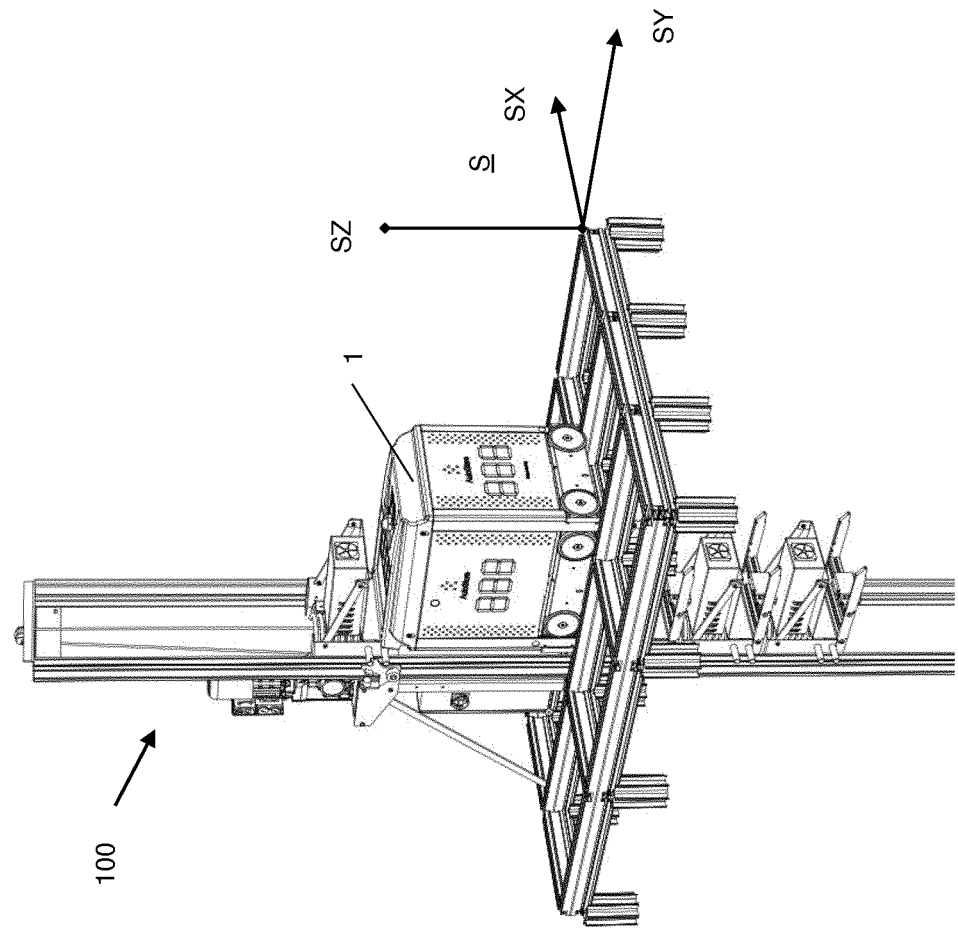
FIG. 5 shows a perspective view of the assembly of FIG. 3, where the robot is moved closer to the assembly.

The charging station assembly 100 further comprises a transportation device 140 for vertical transportation of the charging stations 120 in relation to the base 14. The transportation device 140 is shown in FIGS. 4 and 5 and comprises a remotely operated motor 141 and a wire drum 142 configured to be rotated by the motor 141. A sheave 143 is rotably connected to the cross member 113 in the upper end 111a of the guiding columns 111. A wire 144 is connected between the wire drum 142 and the lowermost charging station 120d via the sheave 143. Hence, by winding the wire onto the wire drum, the lowermost charging station 120d is pulled upwardly via the wire. The fourth and lowermost charging station 120d will then push the third charging station 120c upwardly when they come into contact with each other, which again will push the second charging station 120b and then the first and upper charging station 120a upwards. By winding the wire out from the wire drum, the fourth charging station 120d will move downwardly due to gravity, provided that the movement is not prevented by any obstructions. The other charging stations 120 will follow the fourth charging station 120d, also provided that their movement is not prevented by any obstructions. If one of the charging stations 120 are obstructed, that one charging station and the charging stations above that one charging station 120 will be stopped.

The charging station assembly 100 further comprises a holding device 150 configured to selectively hold one of the charging stations 120a-d. The holding device 150 is holding one of the charging stations by preventing its downwardly directed movement.

In the present embodiment, there are two holding devices 150, each comprising a holding base 151, where the first holding base is connected to the guiding column 111 and the second holding base is connected to the second guiding column 111 as shown in FIG. 8. In the following, one of the holding devices 150 will be described with reference to FIGS. 10a-b, 11a-b and 12a-b.

The holding device 150 comprises a holding element 152 pivotably connected to the holding base 151. The pivoting axis is indicated as reference number 159. The pivoting axis 159 is horizontal and parallel with the pins 125, 126.

The holding element 151 is made from a plate-shaped body with a recess 154 adapted to receive the holding pin 125 and a first stopping element 155 formed as a protruding section of the holding element 152. Adjacent to the recess 154, a magnet 152 is fixed to the holding element 153.

The holding base 152 further comprises an electromagnet 156 facing towards the magnet 153 and a second stopping element 157 adapted to be engaged with the first stopping element 156.

It is now referred to FIG. 10a, where the holding device 150 is in its first state. A vertical dashed line AL is drawn through the center of the holding pin 125 parallel to the guiding column 111, i.e. the longitudinal center axis of pin 125 is intersecting the line AL. The longitudinal center axis of pin 126 is also intersecting the line AL.

Here, the magnet 153 is not engaged with the electromagnet 156 as shown in the enlargement of FIG. 10b. The holding element 151 has rotated clockwise until the first and second stopping elements 156, 157 are engaged with each other. In this position, the recess 156 is aligned with the vertical line AL and the charging station 120c has been lowered until the holding pin 125 has been engaged with the recess 156. In this state, the charging station 120c is held by the holding device 150. By winding the wire 144 out from the wire drum 142, only the charging station 120d below the charging station 120c held by the holding device 150 will be lowered further. However, by winding the wire onto the wire drum, the lowermost charging station 120d will be pulled upwardly until it becomes in contact with the charging station 12c held by the holding device 150. The holding device 150 is not preventing upwardly directed movement of the charging station 120c, and all charging stations will now be moved upwardly.

It should be noted that the pushing pin 126 will push the holding element 151 counterclockwise during its movement upwardly, and the magnet 153 is pushed closer to, or into contact with, the electromagnet 156. If the electromagnet 156 is powered, the electromagnet 156 will hold the holding element 151 in the position shown in FIG. 11b, which is referred to as the second state. In this second state, all charging stations 120a-d may be lowered downwardly, as the holding element 151 is not in a position to obstruct such movement, i.e. it is out of alignment with the locking pin 125. In this second state, the first and second stopping elements 156, 157 are not engaged with each other.

When the power supply to the electromagnet 151 is turned off, the holding element 151 will rotate clockwise again due to gravity until the movement is stopped by the stopping elements 156, 157 engaging with each other. Similar to the first state, the recess 156 is aligned with the vertical line AL.

Before the power supply to the electromagnet 151 is turned off, the charging station 120 to be held by the holding device 150 has been moved to an initial height Hi (shown in FIG. 12b) above the desired height H by means of the transportation system 140. However, the holding pin 125 of the charging station 120 has not yet been lowered into engagement with the recess 154. Hence, this third state is also referred to as an intermediate state. By lowering the charging pin 125 into engagement with the recess 154, the holding device 150 is in its first state again.

It is now referred to FIGS. 3 and 4 again.

Here it is shown a cabinet 160 in which a power supply system 160 is provided. The power supply system 160 is supplying energy to the charging units 130 of the charging stations 120, to the transportation device 140 and to the electromagnet of the holding device 150. In the present embodiment, one of the, and preferably the uppermost of the, charging units 130 is connected to the power supply system 160, and the other charging stations are connected to that charging station a flexible electrical conductor 162, allowing the charging stations 120 to be vertically displaced with respect to each other. The electrical conductor 162 may for example be spiral-shaped.

The operation of the storage system 3 and the charging station assembly 100 will now be described. First, it is referred to FIGS. 3 and 4, where the charging station 120c is located at an exchange location EL in which the power source carrier 122 is located at a predetermined height H above the base 14. This height corresponds to the height suitable for the vehicle 1 to deliver and receive a power source. This exchange location EL is located in the vehicle operating space S.

The location above the vehicle operating space S is referred to as upper location UL, while the location below the vehicle operating space S is referred to as a lower location LL below the vehicle operating space S.

Figure 15A:
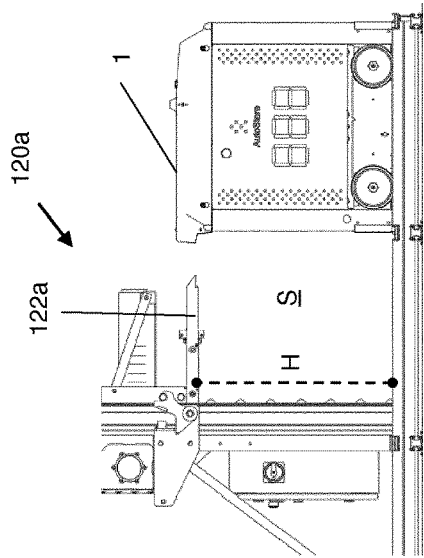
FIG. 15a-15f illustrates the power source exchange process.

In FIG. 15a it is shown a vehicle 1 with a battery 106a which needs to be charged is driven to the charging station assembly 100 of the storage system 3. The vehicle 1 is in communication with the charging station assembly 100 directly or is in communication with the charging station assembly 100 via a control system for the storage system 3.

In a first step, the charging station assembly 100 vertically displaces a first, unoccupied, power source carrier 122a of a first charging station 120a to a predetermined height H above the base 14, as shown also in FIG. 4. This is done by first elevating the first charging station 120a to a position slightly above the desired height H, i.e. the abovementioned height Hi. Then the holding device is brought to its third state as shown and described above with reference to FIG.

12b before the charging station 120a is lowered to a position in which its holding pin 125 is engaged with the recess 154 as described above with reference to FIG. 10b. Now, the holding device 150 is in its first state. The battery carrier 122a and its charging station 120a is now in the exchange location EL.

For the vehicle 1 to be able to approach the carrier 122a, other charging stations are removed from the vehicle operating space S. Charging stations 120b-d below the charging station 120a held by the holding device 150 are lowered by the transportation device 140 to the lower location LL below the vehicle operating space S. In FIGS. 4, 5 and 6, it is shown that there are three charging stations 120b-d located at the lower location LL. There are no charging stations in the upper location UL.

Figure 15B:
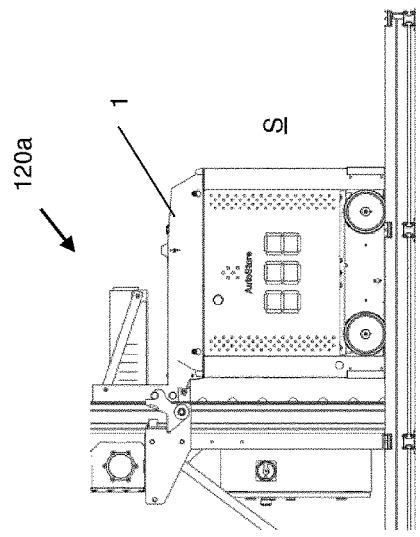
Figure 15C:
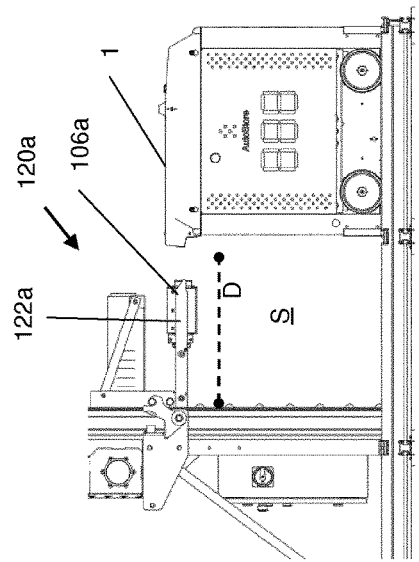

In the next step shown in FIG. 15b, the vehicle 1 is driven towards the first, unoccupied, power source carrier 122. The power source 106a is now disconnected from the vehicle 1 and connected to the first power source carrier 122a. The connector 107b of the battery 106a is now electrically connected to the charging unit 130 via the connector 131 of the charging station 120 and the charging of the battery 106a may start.

The vehicle 1 is performing the delivery of its battery 106a by approaching the carrier 122a in an elevated state. When the vehicle 1 is in the position shown in FIG. 15a, the vehicle 1 is lowered, causing the battery 106a to be carried on the carrier 122a instead of being carried by the vehicle 1. The vehicle 1 is then moved a predetermined distance D away from the first power source carrier 122 in the lowered state, thereby leaving the battery 106a on the carrier 122a. The distance D must be sufficiently long for the battery station assembly 100 to be able to vertically displace the charging stations 120 again.

It should be noted that the operation of elevating and lowering the vehicle in relation to the grid 14 is a known feature of such vehicles. This operation is for example used when the vehicle 1 is to change its direction of travel on the rails 13, for example from traveling in the SY-direction to the SX-direction in FIG. 5.

In alternative embodiments, the vehicle itself may comprise a battery carrier which may be lowered and elevated to desired heights. In such an embodiment, the entire vehicle is not elevated or lowered, only the battery carrier within the vehicle.

In yet an alternative embodiment, the carrier 122 of the charging station 120 can be elevated and lowered with respect to the frame structure 121 of the charging station. In such an embodiment, the vehicle and the battery carrier within the vehicle is not elevated or lowered.

Figure 15D:
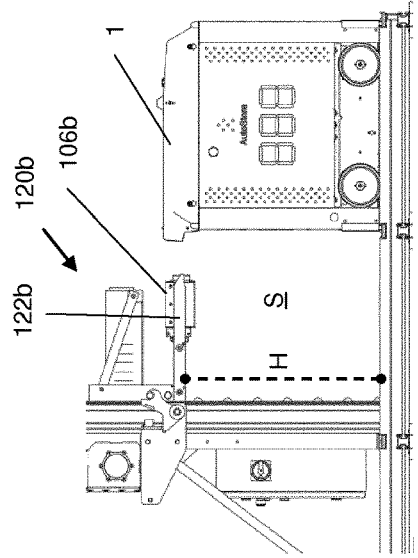

It is now referred to FIG. 15d. Here, the assembly 100 has performed a vertical displacement of a second power source carrier 122b of a second charging station 120b to the predetermined height H above the base 14. The second power source carrier 122b is carrying a second power source 106b which has been charged to an operational level.

Again, the other charging stations 120a, 120c-d is moved to either the upper location UL or the lower location LL. In this example, the upper charging station 120a is located in the upper location LL while the third and fourth charging stations 120c, 120d are located in the lower location LL.

Figure 15E:
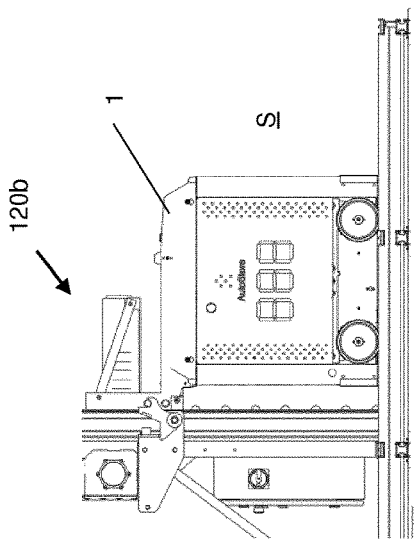
Figure 15F:
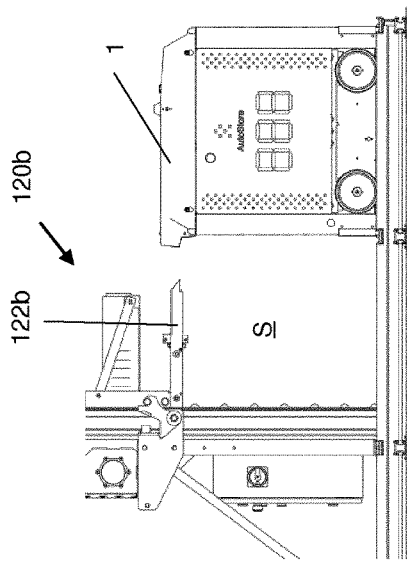

In the next step shown in FIG. 15e, the vehicle 1 is driven towards the second power source carrier 122b. The vehicle 1 is now driven in the lowered state towards the carrier 122b. In the position shown in FIG. 15e, the vehicle is elevated, causing the vehicle 1 to lift the battery 106b instead of the battery 106b being lifted by the carrier 122b.

The power source 106b is now disconnected from the second power source carrier 122b and is connected to the vehicle 1. The connector 107a of the battery 106b is also electrically connected to the vehicle 1, and the vehicle 1 can now be powered by the battery 106b.

In FIGS. 7, 8 and 9, it is shown that the third charging station 120c is in the exchange location EL, while the fourth charging station 120d is in the lower location and the first and second charging stations 120a, b are in the upper location UL. Here it is shown how the wire 144 is guided from the sheave 142 and down to the fourth charging station 120d. It is also shown how the spiral-shaped flexible electrical conductor 162 is used to connect the third and fourth stations 120c, 120d to each other. The first, second and third stations 120a-c each have a battery connected to their carriers 122, while the fourth station 120d is empty and ready to receive a battery.

The invention claimed is:
1. A storage system comprising:
a bin storing grid for storing storage bins in columns of the grid;
a base with rails provided on top of the grid;
a vehicle configured to move horizontally along the rails in a vehicle operating space, each vehicle being powered by a rechargeable power source;
a charging station assembly for charging the rechargeable power sources;
wherein the vehicle comprises an additional battery allowing the vehicle to move a relatively smaller distance during an exchange of the rechargeable battery;
wherein the charging station assembly comprises:
a plurality of charging stations located above each other, each charging station comprising a power source carrier for carrying one of the respective power sources;
a charging station support for supporting the charging stations in relation to the base;
a transportation device connected to the base for vertical displacement of the charging stations in relation to the base;
wherein the charging station assembly is configured to selectively hold one of the charging stations at an exchange location in which the power source carrier of the one charging station is at a predetermined height above the base;
wherein the transportation device is configured to vertically displace other charging stations to an upper location above the vehicle operating space or to a lower location below the vehicle operating space;
wherein the vehicle is configured to move horizontally towards the power source carrier which is held at the exchange location to deliver a power source which is in need of charging to the power source carrier;
wherein the vehicle is then configured to move horizontally away from the charging station while the charging station assembly is vertically displacing another power source which has been charged to an operational level to the exchange location;
wherein the vehicle is configured to move horizontally towards the power source carrier again for delivery of the power source being charged to an operational level from the power source carrier to the vehicle.
2. The storage system according to claim 1, wherein the exchange location is located in the vehicle operating space.
3. The storage system according to claim 2, wherein the charging station support comprises at least one guiding column and wherein each charging station comprises guiding elements configured to be guided by the at least one guiding column.

4. The storage system according to claim 3, wherein the guiding elements comprise rollers or wheels provided in guiding profiles of the at least one guiding column.

5. The storage system according to claim 3, wherein a holding device is fixed to the at least one guiding column.

6. The storage system according to claim 1, wherein the charging station assembly comprises a holding device configured to selectively hold one of the charging stations at the exchange location.

7. The storage system according to claim 1, wherein each charging station comprises a frame structure and a holding pin protruding from the frame structure, wherein a holding device is configured to selectively engage with the holding pin.

8. The storage system according to claim 7, wherein the holding device comprises:
   a holding base;
   a holding element pivotably connected to the holding base;
   a recess provided in the holding element for releasable engagement with the holding pin.

9. The storage system according to claim 8, wherein holding device is configured to be in one of the following states:
   a first state in which the holding pin of one of the charging stations is engaged with the recess;
   a second state in which the holding element is in a position in which the recess is out of alignment with the holding pin of one of the charging stations.

10. The storage system according to claim 9, wherein the holding element comprises a magnet and wherein the holding base comprises an electromagnet; wherein the first state, the magnet is disengaged from the electromagnet and wherein a second state the magnet is engaged with the electromagnet, causing the holding element to be in a position in which the recess is out of alignment with the holding pin of one of the charging stations.

11. The storage system according to claim 10, wherein the holding element comprises a first stopping element and wherein the holding base comprises a second stopping element, wherein the holding device is configured to be in the following state:
   an intermediate state, in which the magnet is disengaged from the electromagnet and where the first and second stopping elements are engaged with each other, causing the recess to be in alignment with the holding pin of one of the charging stations.

12. The storage system according to claim 10, wherein at least one of the charging stations comprises a return pin protruding from the frame structure, wherein the return pin is configured to push the recess of the holding element out of alignment with the holding pin.

13. The storage system according to claim 1, wherein the transportation device comprises:
   a remotely operated motor;
   a wire drum configured to be rotated by the motor;
   a sheave located above the uppermost position of the upper charging station;
   a wire connected between the wire drum and the lowermost charging station via the sheave.

14. The storage system according to claim 13, wherein the sheave is connected to an upper section of at least one guiding column.

15. A method for exchanging a power source of a vehicle operating in a storage system comprising a bin storing grid, a base with rails provided on top of the grid, wherein the vehicle is configured to move horizontally along the rails in a vehicle operating space, where the storage system further comprises a charging station assembly comprising a plurality of charging stations; wherein the method comprises:
   driving a remotely operated vehicle with a power source to be charged to the charging station assembly;
   vertically displacing a first, unoccupied, power source carrier of a first charging station to a predetermined height above the base;
   vertically displacing other charging stations to an upper location above the vehicle operating space and to a lower location below the vehicle operating space;
   driving the remotely operated vehicle horizontally towards the first, unoccupied, power source carrier;
   disconnecting the power source to be charged from the vehicle and connecting it to the first power source carrier;
   driving the remotely operated vehicle horizontally a predetermined distance away from the first power source carrier;
   vertically displacing a second power source carrier of a second charging station to the predetermined height above the base, the second power source carrier carrying a second power source charged to an operational level;
   vertically displacing other charging stations to the upper location or the lower location;
   driving the remotely operated vehicle horizontally towards the second power source carrier;
   disconnecting the power source from the second power source carrier and connecting it to the vehicle.

16. The storage system according to claim 1, wherein each charging station comprises a charging unit, wherein the charging units are electrically connected to each other by means of flexible electrical conductors, and where at least one of the charging units is electrically connected to a power supply system.

17. The method according to claim 15, wherein vertically displacing one of the power source carriers to the predetermined height comprises:
   moving a holding element of a holding device out of alignment with holding pins of the charging stations;
   moving the one charging station to an initial height above desired height;
   moving a recess of the holding element into alignment the holding pin of the one charging station;
   vertically move the charging station until the holding pin is engaged with the recess.

18. A storage system comprising:
   a bin storing grid for storing storage bins in columns of the grid;
   a base with rails provided on top of the grid;
   a vehicle configured to move horizontally along the rails in a vehicle operating space, each vehicle being powered by a rechargeable power source;
   a charging station assembly for charging the rechargeable power sources;
   wherein the vehicle comprises an additional battery allowing the vehicle to move a relatively smaller distance during an exchange of the rechargeable battery;
   wherein the charging station assembly comprises:
   a plurality of charging stations located above each other, each charging station comprising a power source carrier for carrying one of the respective power sources;

a charging station support for supporting the charging stations in relation to the base;

a transportation device connected to the base for vertical displacement of the charging stations in relation to the base;

wherein the charging station assembly is configured to selectively hold one of the charging stations at an exchange location in which the power source carrier of the one charging station is at a predetermined height above the base;

wherein the transportation device is configured to vertically displace other charging stations to an upper location above the vehicle operating space and to a lower location below the vehicle operating space;

wherein the vehicle is configured to move horizontally towards the power source carrier which is held at the exchange location to deliver a power source which is in need of charging to the power source carrier;

wherein the vehicle is then configured to move horizontally away from the charging station while the charging station assembly is vertically displacing another power source which has been charged to an operational level to the exchange location;

wherein the vehicle is configured to move horizontally towards the power source carrier again for delivery of the power source being charged to an operational level from the power source carrier to the vehicle.

* * * * *